UNITED STATES PATENT OFFICE.

JOHANN JAKOB BRACK, OF BASLE, SWITZERLAND, ASSIGNOR TO L. DURAND, HUGUENIN & CO., OF ST. FONS, FRANCE, BASLE, SWITZERLAND, AND HÜNINGEN, GERMANY.

RED TETRAZO DYE.

SPECIFICATION forming part of Letters Patent No. 516,756, dated March 20, 1894.

Application filed December 19, 1893. Serial No. 494,078. (Specimens.) Patented in France April 17, 1893, No. 229,422, and in England June 28, 1893, No. 12,704.

*To all whom it may concern:*

Be it known that I, JOHANN JAKOB BRACK, a citizen of the Swiss Republic, residing at Basle, Switzerland, have invented new and useful Improvements in the Production of Tetrazo Coloring-Matters, (partly patented by the firm L. Durand, Huguenin & Co., of St. Fons, near Lyons, France, Basle, Switzerland, and Hüningen, Germany, in France by Letters Patent No. 229,422, dated April 17, 1893, and in England by Letters Patent No. 12,704, dated June 28, 1893;) and I do hereby declare the following to be a full, clear, and exact description of the invention.

This invention relates to the manufacture of new coloring matters which dye unmordanted cotton, in an alkaline bath, a red tint or color, the said coloring matters being obtained by combining a naphtylamin-sulfo-acid, such, for instance, as naphthionic acid, with the tetrazo-derivative of the diamido-base obtained by the condensation of formaldehyde with a paradiamin and the hydrochlorate of a mono-amido-compound.

By way of examples, I will now describe the production of red coloring matters obtained with naphthionic acid and the diamido-bases derived from formaldehyde, tolidin and anilin, or orthoamido-phenol.

I. *Production of the dye by combining alpha-naphthionic acid with the tetrazo-compound of the diamido-base derived from formadehyde, tolidin and hydrochlorate of anilin.—* 3.2 kilos of the diamido-base obtained by the reaction of one molecule of formaldehyde on one molecule of tolidin and one molecule of anilin hydrochlorate, are diazotized by eight kilos of hydrochloric acid of 21° Baumé and 1.4 kilos of sodium nitrite. The tetrazo-compound thus obtained is poured, with agitation, into a solution of 4.9 kilos of naphthionate of soda, and eight kilos of acetate of soda. After standing twelve hours the product of the reaction is supersaturated with a carbonate of soda solution, the mixture is boiled and the dye stuff which is formed is precipitated from its solution by means of salt. When dried it is a red brown powder which dyes unmordanted cotton red in an alkaline bath. This powder is readily soluble in water, only slightly soluble in alcohol and the solution in concentrated sulfuric acid is a red violet.

II. *Production of the dye by combining alpha-naphthionic acid with the tetrazo-compound of the diamido-base derived from formaldehyde, tolidin and hydrochlorate of orthoamido-phenol.—* 3.4 kilos of the diamido-base obtained by the reaction of one molecule of formaldehyde on one molecule of tolidin and one molecule of hydrochlorate of orthoamido-phenol, are diazotized by means of eight kilos of hydrochloric acid at 21° Baumé and 1.4 kilos of sodium nitrite. The tetrazo-derivative thus obtained is poured, while carefully agitating, into a solution of 4.9 kilos of naphthionate of soda and eight kilos of acetate of soda. After leaving the mass to stand for twelve hours and then heating it to 50° or 60° centigrade, the formation of the coloring matter is completed by precipitating by the addition of sea salt, filtering and drying. The coloring matter thus prepared is in the form of a red-brown powder which, in an alkaline bath, dies unmordanted cotton red. It is readily soluble in water, sparingly soluble in alcohol, and its solution in concentrated sulfuric acid is grayish blue violet color.

What I claim as my invention, and wish to secure by Letters Patent, is—

1. The herein described process for the manufacture of tetrazo-coloring matters which consists in combining two molecules of a naphtylamin-sulfo-acid with one molecule of the tetrazo-derivative of the unsymmetrical diamido-base resulting from the condensation of one molecule of formaldehyde with one molecule of a paradiamin and one molecule of the hydrochlorate of a monoamido-compound, as set forth.

2. The herein described process for the manufacture of red tetrazo-coloring matters which consists in combining two molecules of alpha-naphthionic acid with one molecule of the tetrazo-derivative of the unsymmetrical diamido-base resulting from the reaction of equivalent quantities of formaldehyde, tolidin and the hydrochlorate of a monoamido-compound, as set forth.

3. The herein described tetrazo coloring matter derived from alpha-naphthionic acid and an unsymmetrical diamido-base obtained by the condensation of formaldehyde with tolidin and the hydrochlorate of a monoamido compound, which coloring matter is readily soluble in water, and only slightly soluble in alcohol, which dyes unmordanted cotton a red tint or color which dissolves in concentrated sulfuric acid, imparting a violet color to the solution and which is, when in a dry state, a red-brown powder, as set forth.

In witness whereof I have hereunto signed my name in the presence of two subscribing witnesses.

JOHANN JAKOB BRACK.

Witnesses:
 THEODORE STACHELIN,
 AMAND RITTER.